April 10, 1934.    W. KOWAL    1,954,737
SEALING HEAD FOR JARS
Filed June 28, 1932
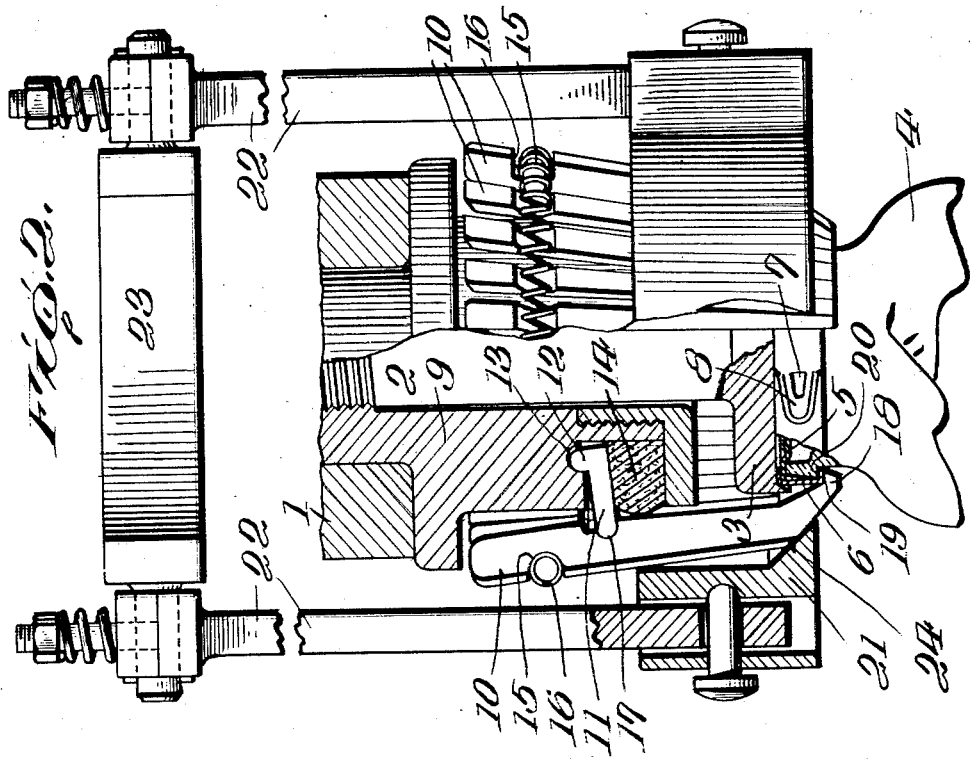
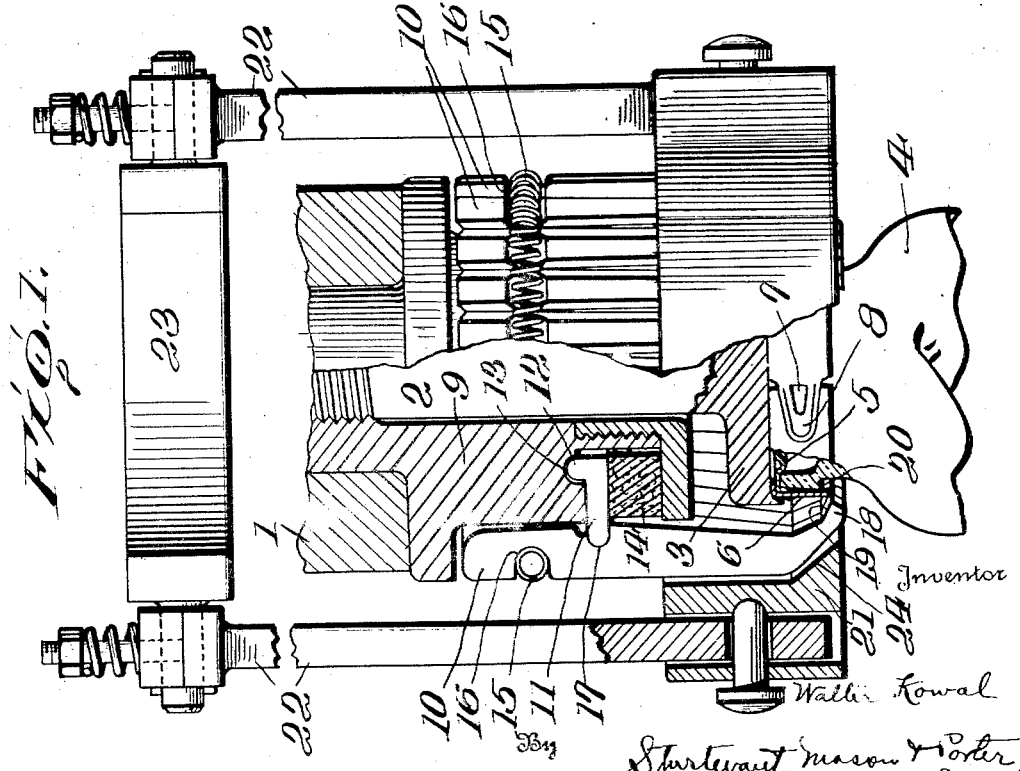

Patented Apr. 10, 1934

1,954,737

UNITED STATES PATENT OFFICE 1,954,737

SEALING HEAD FOR JARS

Walter Kowal, Brooklyn, N. Y., assignor to Phoenix Metal Cap Co., Inc., Brooklyn, N. Y., a corporation of New York Application June 28, 1932, Serial No. 619,783

3 Claims. (Cl. 226—86)

The invention relates to new and useful improvements in a sealing head for jars, and more particularly to a sealing head of the type shown in the patent granted Tom Sutcliffe, December 25, 1928, No. 1,696,819. In the patent referred to, the flange of the jar closure is turned underneath a shoulder on the jar neck by means of a coiled spring which contacts with the flange.

An object of the present invention is to provide a head of the above type with flange turning fingers which are mounted for swinging movement toward and from the flange and also for yielding vertical movement so as to accommodate irregularity in the glass finish of jars.

A further object of the invention is to provide a sealing head of the above type with sealing fingers which are mounted for independent swinging movement and also independent vertical movement, which head is also provided with a movable cam ring adapted to engage and impart movement to said fingers.

These and other objects will in part be obvious and will in part be hereinafter more fully disclosed.

In the drawing—

Figure 1 is a view partly in vertical section and partly in side elevation through a sealing head showing a jar in position for sealing and with the sealing fingers retracted;

Fig. 2 is a similar view, but showing the sealing fingers moved into engagement with the flange of the jar closure for sealing the jar.

In the patent to Sutcliffe referred to, there is shown and described a machine for placing closures on jars and the like, which includes a stationary head forming a chuck which receives the assembled jar closure and jar. The jar is placed on a support and is raised into contact with the chuck and pressed against the chuck so as to tightly hold the closure in contact with the lip of the jar, preparatory to the turning of the flange of the closure underneath a shoulder on the jar for completing the sealing of the jar. The present invention has to do with an improvement in the structure of the sealing head shown in said patent. In applicant's device, the turning of the flange underneath the shoulder on the jar is accomplished by swinging fingers which are mounted on the head on fulcrum arms which are independent of each other, so that the fingers may swing independently and also move vertically independently to a limited extent. These fulcrum arms are in turn supported by an elastic block which normally holds the fingers raised, but which is capable of yielding to allow a limited independent downward movement of each finger. The fingers are separated from each other at their lower ends by a spring which encircles all of the fingers, moving the upper ends thereof against the head. In this position, the head is open so as to receive the jar and the closure which has been placed thereon. After the jar has been lifted into contact with the chuck, so that the closure is pressed firmly against the jar, then an operating cam ring is raised, bringing the cam face thereof into contact with the cam faces on the individual fingers, and this will cause the fingers to move inward so as to contact with the flange of the jar. The levers swing on the fulcrum arms supporting the same. As the fingers move inward at their lower ends, the upper faces thereof assume more of a horizontal position, thus tucking the inturned portion of the flange well up against the shoulder on the jar neck. As the fingers swing inwardly, they also move downwardly through the swinging of the fulcrum arms, and this brings the jaw end of the finger well under the shoulder and also imposes a substantially uniform pressure on the jar neck, regardless of any irregularities in the glass finish, as each finger yields independently of the others.

The invention will probably be better understood by a detail description of the structure set forth in the present illustrated embodiment thereof. It is not thought necessary to show in detail the entire machine which is similar to that shown in the Sutcliffe patent. The machine includes a supporting bracket 1 which is fixed to the standard of the machine so that it has no movement. Located within the supporting bracket is a head 2 carrying a chuck 3. The jar to be closed is indicated at 4 in the drawing. The type of closure illustrated includes a jar closure 5 and a clamping band 6 which may be of strip form with the ends joined by a locking lug 7 projecting through a lifting tongue 8 (see Fig. 2). The closure is placed on the jar, and after the closure and jar have thus been assembled, the jar is placed on a suitable support and is lifted so as to cause the closure to contact with the chuck 3, which is held in a fixed position.

The closure head includes a finger supporting member 9 around which are located a plurality of fingers 10. These fingers are placed side by side, and each finger is mounted on a fulcrum arm 11. The fulcrum arm has an upwardly projecting rounded lug 12 fitting a recess 13 in the finger supporting member 9. These fulcrum arms 11 rest on an elastic member 14 which may be in the form of a ring or separate blocks beneath each fulcrum arm. A coiled spring 15 encircles the arms, resting in a recess 16 in each arm, and this spring normally holds the upper ends of the fingers pressed against the finger supporting member 9. The ends of the fulcrum arms 11 are rounded and project into recesses 17 formed in the inner face of the fingers. This serves as a supporting means for the finger on which said finger may swing. Each finger 10 is provided with a crimping jaw 18, the upper face 19 of which is slightly inclined to the horizontal when the finger is in its retracted position. The jaw end of the finger is comparatively small, and therefore, the neck of the jar may be relatively short. The jar is provided with a shoulder 20, and the flange 6 of the closure extends below this shoulder and is turned underneath the shoulder for the clamping of the closure to the jar. The neck of the jar referred to is that portion between the shoulder 20 and the body portion of the jar beneath the same.

Surrounding the fingers 10 is an operating cam ring 21. This operating cam ring 21 is attached to links 22 and the links 22 are in turn pivotally connected to an operating lever 23 which may be swung in any suitable way for raising or lowering the operating cam ring 21. This operating cam ring has a cam face 24 which inclines upwardly and outwardly from the lower end of the ring. The fingers 10 also have cam faces 25 which are similarly shaped and positioned when the fingers are retracted. When the cam ring is raised, this cam face 24 on the ring engaging the cam face 25 on the fingers will force the lower ends of the fingers inwardly. The fingers cannot move upwardly from their initial position, but only swing inwardly when the cam contacts therewith. This brings the jaw end of the fingers into contact with the outer face of the flange of the closure and the point of contact between the jaw end of the finger and the flange is well above the lower edge of the flange, but also well below the shoulder on the jar. The continued inward pressure on the fingers by the upward movement of the ring will tuck or turn the lower edge portion of the flange underneath the shoulder. The upper face 19 of the crimping jaw moves to a substantially horizontal position when the fingers are in their full forward crimping position. This brings a substantially horizontal pressure to bear on the inturned portion of the flange which will lay the same flat against the horizontally arranged shoulder on the jar. The fulcrum arms 11 may move downwardly and allow the finger supported thereby to move downwardly. If there is any inequality in the glass finish, or any unevenness in the finish, the fingers will yield to take care of this irregularity, so that the clamping strain of the fingers on the jar neck is substantially uniform for all jars and at all regions in each jar. This enables a firm clamping pressure to be exerted against the inturned portion of the flange of the closure, so as to bring about a tight sealing of the jar, and it also avoids any breaking of the jars, due to excessive pressure thereon during closure.

It is obvious that other ways may be used for operating the fingers than that shown in the drawing, as the essential feature of the invention is the mounting of the fingers so that they not only have a swinging movement, but an independent yieldable vertical movement. It is also obvious that minor changes may be made in the details of construction without departing from the spirit of the invention as set forth in the appended claims.

Having thus described the invention, what I claim as new and desire to secure by Letters Patent, is—

1. A jar closing device comprising a stationary head, a chuck rigidly attached thereto and adapted to engage a jar closure applied to a jar, fingers carried by said head and having crimping jaws at their lower ends and the outer faces thereof tapered upwardly and outwardly, means for pivotally supporting said fingers on said head so that the fingers may swing and move bodily vertically independent of each other, and a cam ring having cam faces engaging the tapered faces on said fingers thereof for forcing said fingers into engagement with the flange of the closure for turning the flange underneath a shoulder on the jar.

2. A jar closing device comprising a stationary head, a chuck rigidly attached thereto and adapted to engage a jar closure applied to a jar, fingers having crimping jaws, a fulcrum arm for each finger, said arm being mounted on said head and yieldingly supported in a raised position, said fingers being mounted to swing on said fulcrum arms so that the crimping jaws may be moved toward and from the flange of the jar closure, spring means for retracting said fingers, and cam means operating to force said crimping jaws into contact with the flange and for turning said flange under a shoulder on the jar, said fulcrum arms yielding downwardly to accommodate irregularities in the glass finish of the jar.

3. A jar closing device comprising a stationary head, a chuck rigidly attached thereto and adapted to engage a jar closure applied to a jar, fulcrum arms carried by said head, yielding means for supporting said arms and permitting the same to move independently in a downward direction, a finger mounted on each fulcrum arm for a swinging movement, said fingers having crimping jaws at the lower ends and the outer faces thereof tapered upwardly and outwardly, a spring encircling said fingers above the fulcrum arms for normally holding the crimping jaws retracted, and a cam ring having a tapered face adapted to engage the tapered face on each finger for forcing the crimping jaws into contact with the flange of the jar closure for turning said flange under a shoulder on the jar, said fulcrum arms yielding to permit said jaws to move downwardly to accommodate irregularities in the glass finish of the jar.

WALTER KOWAL.